US010706731B2

(12) United States Patent
Harper-Ray et al.

(10) Patent No.: US 10,706,731 B2
(45) Date of Patent: Jul. 7, 2020

(54) ATTENDANCE MONITORING SYSTEM

(71) Applicants: Steven Harper-Ray, Cincinnati, OH (US); Renee Altier, Saint Louis, MO (US)

(72) Inventors: Steven Harper-Ray, Cincinnati, OH (US); Renee Altier, Saint Louis, MO (US)

(73) Assignee: Bedford, Freeman & Worth Publishing Group, LLC, New York, NY (US)

( * ) Notice: Subject to any disclaimer, the term of this patent is extended or adjusted under 35 U.S.C. 154(b) by 747 days.

(21) Appl. No.: 15/384,525

(22) Filed: Dec. 20, 2016

(65) Prior Publication Data
US 2018/0047297 A1 Feb. 15, 2018

Related U.S. Application Data

(60) Provisional application No. 62/372,929, filed on Aug. 10, 2016.

(51) Int. Cl.
| | |
|---|---|
| G09B 5/00 | (2006.01) |
| H04W 4/24 | (2018.01) |
| H04M 15/00 | (2006.01) |
| G06Q 50/20 | (2012.01) |
| H04W 4/02 | (2018.01) |

(52) U.S. Cl.
CPC .............. *G09B 5/00* (2013.01); *G06Q 50/205* (2013.01); *H04M 15/8033* (2013.01); *H04M 15/8083* (2013.01); *H04W 4/023* (2013.01); *H04W 4/24* (2013.01); *H04M 2250/10* (2013.01)

(58) Field of Classification Search
CPC combination set(s) only.
See application file for complete search history.

(56) References Cited

U.S. PATENT DOCUMENTS

| | | |
|---|---|---|
| 5,550,359 A | 8/1996 | Bennett |
| 5,664,126 A | 9/1997 | Hirakawa et al. |
| 5,842,182 A | 11/1998 | Bonner et al. |
| | (Continued) | |

FOREIGN PATENT DOCUMENTS

WO 2014154481 10/2014

OTHER PUBLICATIONS

IMSI-Catch Me If You Can: IMSI- Catcher-Catchers; Dabrowski, Pianta, Klepp, Mulazzani, Weippl.
(Continued)

*Primary Examiner* — Mark A Fleischer
(74) *Attorney, Agent, or Firm* — Olson & Cepuritis, Ltd.

(57) ABSTRACT

The system set forth herein relates to a network of a server, proctor device and user devices that connect to provide attendance information at a gathering location. The proctor may define an area that constitutes a meeting location for a particular time. Users may connect to a network to join the meeting and when the user is within the area at a particular time, the user can authorize the transmittal of information to alter the system that the user is present. The system is able to determine the proximity of the user to identify a present status without needing to store or transmit the user's actual location to the proctor and thereby maintain a level of anonymity for the user while still confirming the user's presence at the location.

19 Claims, 8 Drawing Sheets

(56) References Cited

U.S. PATENT DOCUMENTS

| | | | |
|---|---|---|---|
| 5,956,696 | A | 9/1999 | Guryel |
| 5,959,541 | A | 9/1999 | DiMaria et al. |
| 6,073,841 | A | 6/2000 | Walton |
| 6,075,455 | A | 6/2000 | DiMaria et al. |
| 6,173,153 | B1 | 1/2001 | Bittman |
| 6,633,223 | B1 | 10/2003 | Schenker et al. |
| 6,774,797 | B2 | 8/2004 | Freathy et al. |
| 7,212,829 | B1 | 5/2007 | Lau et al. |
| 7,298,673 | B2 | 11/2007 | Pappas et al. |
| 7,327,251 | B2 | 2/2008 | Corbett, Jr. |
| 7,366,522 | B2 | 4/2008 | Thomas |
| 7,367,491 | B2 | 5/2008 | Cheng et al. |
| 7,424,618 | B2 | 9/2008 | Roy et al. |
| 7,590,589 | B2 | 9/2009 | Hoffberg |
| 7,684,548 | B1 | 5/2010 | Rodkey et al. |
| 7,809,377 | B1 | 10/2010 | Lau et al. |
| 7,826,645 | B1 | 11/2010 | Cayen |
| 7,835,955 | B1 | 11/2010 | Brodsky et al. |
| 8,260,321 | B1 | 9/2012 | Dunko |
| 8,301,158 | B1 | 10/2012 | Thomas |
| 8,353,705 | B2 | 1/2013 | Dobson et al. |
| 8,380,630 | B2 | 2/2013 | Felsher |
| 8,489,118 | B2 | 7/2013 | Dunko |
| 8,547,222 | B2 | 10/2013 | Aninye et al. |
| 8,600,289 | B1 | 12/2013 | Hillier et al. |
| 8,600,830 | B2 | 12/2013 | Hoffberg |
| 8,600,895 | B2 | 12/2013 | Felsher |
| 8,611,920 | B2 | 12/2013 | Lau et al. |
| 8,700,050 | B1 | 4/2014 | Thomas |
| 8,725,165 | B2 | 5/2014 | Lau et al. |
| 8,868,103 | B2 | 10/2014 | Thomas |
| 8,874,024 | B2 * | 10/2014 | Argott ............... G09B 7/02 434/351 |
| 8,886,220 | B2 | 11/2014 | Lau et al. |
| 9,060,014 | B2 | 6/2015 | Crowley |
| 9,071,940 | B2 | 6/2015 | Ramachandran |
| 9,076,027 | B2 | 7/2015 | Miura et al. |
| 9,076,077 | B2 | 7/2015 | Cohen |
| 9,219,988 | B2 | 12/2015 | Lau et al. |
| 2003/0060212 | A1 | 3/2003 | Thomas |
| 2004/0066276 | A1 | 4/2004 | Gile et al. |
| 2006/0035205 | A1 | 2/2006 | Dobson et al. |
| 2008/0088438 | A1 | 4/2008 | Aninye et al. |
| 2009/0148827 | A1 | 6/2009 | Argott |
| 2010/0102964 | A1* | 4/2010 | Steer ............... G06Q 10/08 340/572.1 |
| 2010/0161462 | A1 | 6/2010 | Pappas et al. |
| 2010/0235285 | A1 | 10/2010 | Hoffberg |
| 2010/0267399 | A1 | 10/2010 | Sweeney et al. |
| 2013/0054750 | A1 | 2/2013 | Rossmann |
| 2013/0211975 | A1 | 8/2013 | Masterson et al. |
| 2013/0290154 | A1 | 10/2013 | Cherry et al. |
| 2014/0025546 | A1 | 1/2014 | Seng et al. |
| 2014/0180710 | A1 | 6/2014 | Mitchley |
| 2014/0207635 | A1 | 7/2014 | Pappas et al. |
| 2014/0278629 | A1 | 10/2014 | Stephenson et al. |
| 2015/0120362 | A1* | 4/2015 | Whorley, Jr. ........ G06Q 50/205 705/7.19 |

OTHER PUBLICATIONS

Enhanced Map-Based Indoor Navigation System of a Humanoid Robot Using Ultrasound Measurements; Back, Kallio, Makela. Intelligent Control and Automation, 2012, 3, 111-116.

Efficient Adaptive Algorithms for DOA Estimation in Wireless Communications; Arceo-Olague, Covarrubias-Rosales, Luna-Rivera, Angeles-Valencia; Int. J. Communications, Network and System Sciences, 2010, 3, 173-176.

Direction of Arrival Estimation and Localization Using Acoustic Sensor Arrays; Kunin, Turqueti, Saniie, Oruklu; Journal of Sensor Technology, 2011, 1, 71-80.

The Active Badge Location System; Want, Hopper, Falcao Gibbons; Olivetti Research Ltd. (ORL), England, Practice and Experience.

Subscriber Location in CDMA Cellular Networks; Caffery Jr., Stuber, IEE Transactions on Vehicular Technology vol. 47, No. 2., May 1998 p. 406-416.

Robust Techniques for Accurate Indoor Localization in Hazardous Environments; Wireless Sensor Network, 2010, 2, 390-401; Scientific Research; Garg.

\* cited by examiner

FIG. 6

| | | |
|---|---|---|
| REEF Education | COURSES | SIGNOUT |

CHEM01

Stop Attendance — 601

ATTENDANCE  ROSTER  CURRENT SESSION

Class Attendance (4) Checked In  (100) Not Checked In  (51) Not Attending

605 ⟶ Session Run Time: 2:24

| Name — 602 | Attendance Status — 603 | Checked In — 604 |
|---|---|---|
| Bass, S M | Checked In | 9:02 AM |
| Blue, Dory R. | Not Attending | - |
| Clownfish, Nemo | - | 9:01 AM |
| Orca, Willie | - | - |
| Pufferfish, Bloat | Checked In | - |
| Snapper, Red | Not Attending | 9:05 AM |
| Starfish, Peach O. | - | - |
| Turtle, Crush S. | Checked In | 9:02 AM |
| Ursula, Octo | Checked In | 9:00 AM |
| Whale, Blue | - | - |

CREATE ACCOUNT     700

*First Name*   701

*Last Name*   702

*Email*   703

*Password*   704

*Retype Password*   705

*Instructor Remote ID (optional)*   706

☐ I agree to the Privacy Policy and terms of Use     Can't find your >clicker Remote ID?

| CREATE ACCOUNT |
|---|

Return to Sign in

FIG. 7

ATTENDANCE MONITORING SYSTEM

CROSS-REFERENCE TO RELATED APPLICATIONS

This application claims priority to U.S. Provisional Application Ser. No. 62/372,929 filed Aug. 10, 2016, the entirety of which is incorporated herein by this reference for all purposes.

FEDERALLY SPONSORED RESEARCH OR DEVELOPMENT

Not Applicable.

BACKGROUND

Often times there are events in which groups of people gather together, and it is desired to obtain proof of an individual's presence at the event. For example, a class event may take place at a particular time and location (though it should be appreciated that similar dynamics to the instructor/student relationship may be exhibited in a wide range of other group gathering settings). In the instructor/student example, described herein for explanatory purposes, the instructor may require the presence of each student registered for a class to be present during and through the class period. The instructor may provide an incentive, such as extra credit, to each student that is present at the class. Thus both the instructor and the student desire a reliable way to determine whether the student is at a class. The instructor only wants to give credit to students that actually show up, and students want to be sure that their presence is recognized by the instructor when they do show up so that they receive the extra credit.

When class sizes are small, the instructor may have little difficulty recognizing which students are present, and which are absent just by looking at the class. As classes grow, an instructor may need to take roll call, calling out each student's name and receiving their response. In either case, the instructor must still take the time to actually record each student's presence, and students may not receive any confirmation that their presence was recognized and properly recorded. When class sizes are large, for example in a Big 10 college lecture hall, it is not practicable for an instructor to visually take stock of the lecture hall and know who is present or absent or to take a roll call.

Additionally, once class begins, the instructor is likely preoccupied with teaching and cannot remain responsible for also tracking the individual presence of each student during class. Students may come for the initial roll call, record their presence, then leave. Alternately, students may leave temporarily for a variety of reasons, to use a restroom for example, and then return. An instructor might see the student leave, but miss that student's return and inappropriately misreport the student's presence for the class.

Accordingly, it is desirable that students and instructors have a way in which they can ensure that the student's presence at the class is accurately recorded and that the student's presence throughout the class is monitored in such a way as to provide limited freedom to enter and exit the class without penalty. It is common that individuals carry a personal data device (such as a phone). It is desirable that the individuals' personal data devices may be used as part of a broader system to identify the individuals' presence at a location. However, privacy concerns relating personal tracking and monitoring often foster resentment by individual device owners where they feel that the monitoring is overbearing or too encompassing so as to intrude on their individual desire for autonomy and freedom.

There are a number of individual tracking systems currently in development or use. These include the systems set forth in U.S. patent application Ser. No. 14/529,675 filed on behalf of Whorley, Jr. et al (published as US 2015/0120362), U.S. patent application Ser. No. 09/797,517 filed on behalf of Thomas (published as US 2003/0060212), U.S. Pat. No. 6,774,797 issued to Freathy et al, U.S. Pat. No. 8,260,321 issued to Dunko, and U.S. Pat. No. 8,874,024 issued to Argott, the disclosures of each of which is incorporated in its entirety herein by this reference for all purposes. While each of the forgoing relate to identification of individuals, they are not ideal for use in a group meeting environment. The systems track individuals too closely. They monitor positions of users all the time. They store the user's location and transmit the user's location to others. Such systems impinge on personal privacy and require continual power and processing draw on the user's device to update the user's position continually. That taxes the battery of the user's device as well as the device's performance due to it needing to continually run the location program or transmit location signals.

The present system provides an optimized system that limits the amount of information required and collected from individual devices while still being capable of determining an individual's location with enough precision to determine whether the student is present within a gross area where an event is taking place. The system balances the need for determining a person's presence during a discrete time and in a general area, with the individual's desire to not be monitored outside of that time or area, and, even when within the time and area, to not have their pinpoint location known and stored. It may also be used by users only during limited times when the event is taking place and reduces the burden placed on the user's device in tracking the user's general location.

SUMMARY

In general, the present system may be utilized by groups of individuals to transmit, collect, and collate data respecting individuals' presences at and generally within a geographic location over a period of time. The overall system is server based where a proctor may access the server, such as through a GUI, website, or other networking interface, and may create a profile that will dictate the functionality of an attendance module within the system. Each individual participant of the group may store a computer application on an electronic device (such as a phone, laptop, tablet, etc.) that is associated with the attendance monitoring system. For example, the computer application may be any one of a number of different clients such as Web application, Apple IOS application, or Google Android application. Each individual may register the device, for example through a website, and create an association, or network, between the proctor, the participant, and the server. Once the three are associated, the system may be utilized to monitor attendance of the individual within a particular location over a particular period of time. A classroom setting is a typical environment where the present system may be employed. To explain the system, reference may be made to an instructor as well as to students and classrooms. However, the classroom setting is provided for explanative purposes and is not meant to be limiting. The system may be used in any group setting by any type of proctor and individuals.

The system may operate in at least two different modes to monitor attendance, for example, a Manual Mode and a Session Mode. In Manual Mode, an instructor uses an electronic device to access the server over the interne and set a location where a class will take place by selecting an area having a perimeter (such as a circle) on a map. The server may be integrated with other web applications for providing the geographic map information, for example the Google Maps web site and service could be utilized. That is, to help the instructor specify exactly where the session will take place, the system may display Google Maps in a web application and the instructor can also specify a range on the map that students must be within before the student is able to identify themselves as present for a session.

The server may store the instructor's set location, such as the instructor's latitude, longitude, geolocation accuracy, and radius buffer. When the instructor wants to take attendance, the instructor sends a message to registered students asking for the students to check-in. Each student receives a check-in notification and must actively agree to transmit their location information. Students outside the set check-in radius are notified that they cannot check-in. Upon agreement by the student, assisted GPS location information is sent to the server (or, alternately, the system may use, for example, Wi-Fi location information or cell tower triangulation). It is possible to generate and transmit high-accuracy location information from various client applications (such as an Apple IOS App, or Google Android App). However, each client may have different levels of accuracy when identifying the location of the device. This accuracy, given in feet or meters for example, defines a buffer around the location of the devices both of the instructor and the student. The accuracy of the location information for both the instructor and the student are taken into account when determining student participation in a session.

The students' geolocation is not stored by the system to avoid privacy issues and to preserve a level of anonymity for the students. Instead, the student's location is used to determine the student's proximity to the instructor and thereby determine whether the student is within the event area set by the instructor so that the student may be designated as "present." The server compares the instructor's set location with the student's proximity to the instructor and may store the student's proximity to the instructor. Thus it is not the student's actual location that determines whether the student is present, but rather the student's proximity to the instructor. That eliminates the need for the system to know, transmit, and store the student's actual location. The student receives a confirmation that they checked in.

The data stored by the server is the instructor's location, the student's proximity to the instructor, and whether the student was present or not. The server does not store the student's actual location as it is unnecessary to know precisely where the student is. In fact, it may be undesirable to know precisely where the student is, or was, located during the class. Rather, all that the system requires is to identify that the student is within the overall geographic area designated by the instructor. In the present system, the instructor also does not receive the student's actual location. Instead, the server may send real-time updates to the instructor identifying the students present and their check-in time.

When in Session Mode, the system allows an instructor to setup a calendar of events by setting one or more event attributes (such as setting date(s), time(s), and map location (s) for class(es)). At the appointed event time, the server may send a message asking students to check-in. The system may then operate in a similar manner as the Manual Mode system.

Another aspect of the present system is a Check-In module that may be added to the Manual Mode and Session Mode. It is a subsystem that is operated by the server to repeatedly check for the student's location. The Check-In module is designed to check the student's location over the duration of the class. The system using the Check-In module may begin its operation as described with respect to both Manual Mode and Session Mode. However, once the student initially grants permission to transmit the student's location at the beginning of the class that permission simultaneously allows the Check-In module to repeatedly request the student's location for the duration of the class. Thus, the student is only required to authorize the location request the first time. The Check-In module may be set to request the student's location according to a timer that is initially triggered by the start of the session. For Manual Mode, the timer may be keyed to the instructor starting the session, for Session Mode the timer may be keyed to the prescheduled class start time or may be separately activated by the instructor.

BRIEF DESCRIPTION OF THE DRAWINGS

FIG. 6 is a depiction of an alternate display of participant attendance within the proctor attendance monitor display.

FIG. 7 is a depiction of an account creation menu.

DETAILED DESCRIPTION OF THE PREFERRED EMBODIMENTS

Embodiments of the present system are described herein for explanatory purposes. The system coordinates and tracks the presence of individual users at events scheduled by a proctor. The users may be students, the proctor may be an instructor, and the event may be a class. As used herein, a "user device" or "student device" (the terms are interchangeable) is a mobile device carried by a user such as, but not limited to, a mobile phone, personal data assistant, tablet, or laptop computer. A "proctor device" or "instructor device" (the terms are interchangeable) may also be a mobile device the same as a user device, but may also be a non-mobile computing device such as a desktop computer. The instructor device may also be more than one device, such as a personal computer that the instructor may access remotely using a mobile phone or tablet. The user device and proctor device are connected to the internet, so that they are able to send and receive signals through the internet to and from a server.

Figure 1:
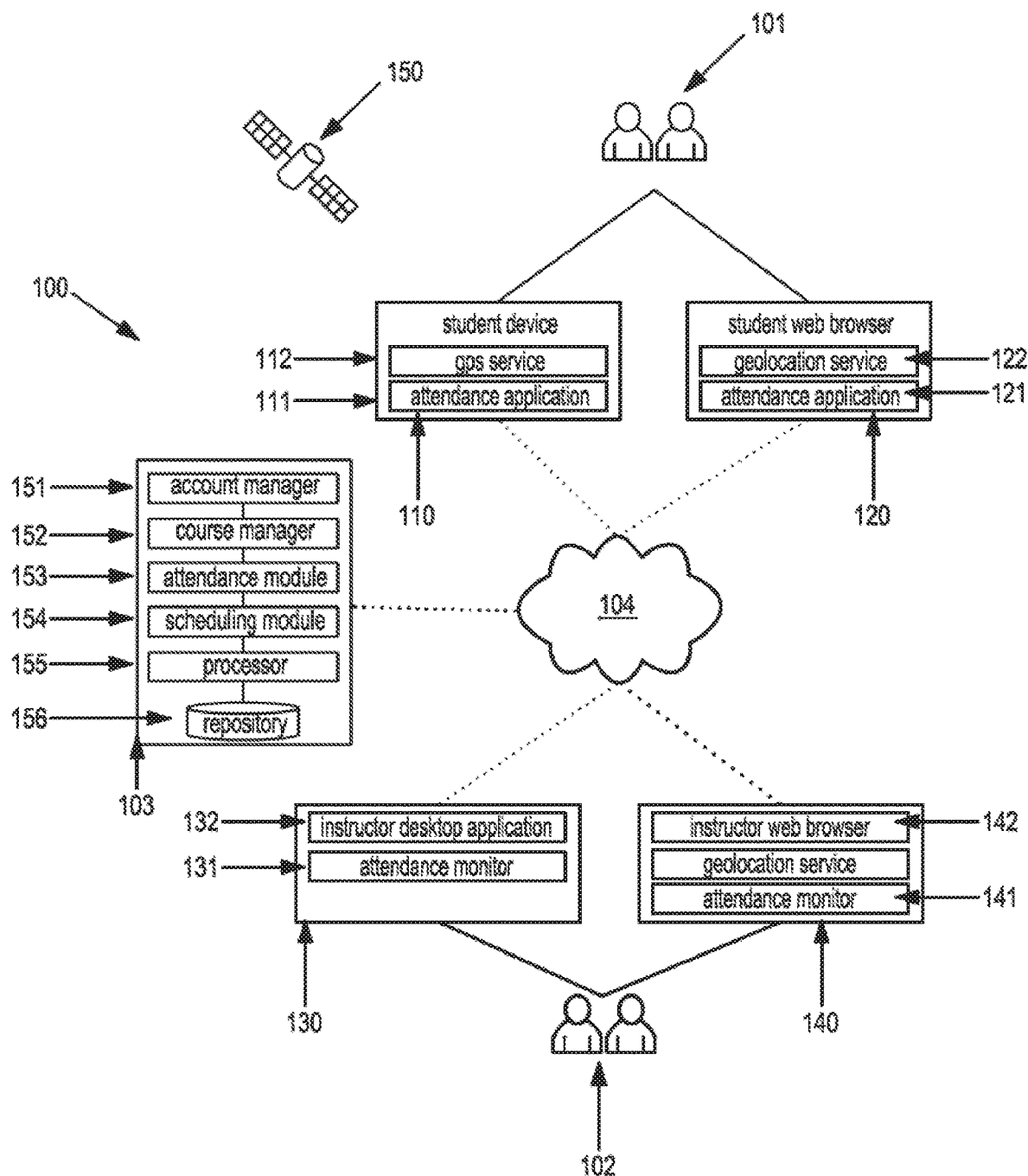
FIG. 1 is a block depiction of a network between the server, one or more proctor devices, and one or more user devices used to form an attendance monitoring system.

One embodiment is shown in FIG. 1 which is a depiction of a network 100 arranged among one or more students or users 101, one or more instructors or proctors 102, and at least one server 103, all of which may be networked together over a communication network 104, such as the internet. Each student carries at least one student device 110, 120, and each instructor is assigned at least one instructor device 130, 140. Preferably, the student device is a mobile phone, such as a smart phone, tablet, laptop, etc. Because the system tracks the presence of the student indirectly through tracking the presence of the student device, it is desirable that the student device be a device that the student is reluctant to separate themselves from or leave away from their person for any appreciable length of time (such as the duration of a class event). That mitigates the risk that the student will give the student device to another student as a means of defrauding the system into cataloging the student as present when they are not. It also mitigates the risk that the student will forget to bring the student device with them to the event or that the student will leave the device at the event when they leave the event.

Each student device includes an attendance application, 111, 121. The attendance application is a program, such as an app, that is stored on the student device and that runs executable computer code that links the student device to the network 100. The attendance application allows the student to register an account within the system. Each student is allowed a single account that associates the attendance application with the student's device and with the student. Preferably, the student is only permitted one copy of the attendance application registered to one account. Limiting the student to a single copy for a single device mitigates the risk that the student will load the attendance application onto a less personally significant device, such as a spare tablet or laptop, that the student would be more willing to temporarily part with during the course of an event while they maintain possession of their primary device (such as their phone). Alternately, in embodiments permitting multiple copies of the attendance application to be loaded onto multiple devices, the attendance application may be configured so that only one session of the attendance application registered to a particular student may be active at any one time. Where a student logs on with one device, such as a tablet, and then attempts to log on with another device, such as a phone, the attendance application may either reject the second log in attempt or it may allow the second log in attempt while simultaneously deactivating the first logged on session.

Additional embodiments may further or alternately include the incorporation of biometric data such as fingerprint identification or facial recognition. Logging into the attendance application or utilization of the attendance application may prompt the input of one or more biometrics. For example, when the proctor starts an attendance session, the attendance application may require the input of biometric data before or in conjunction with transmitting data for use in determining the presence of the user device. These systems help ensure that the user operating the user device and accompanying attendance application is the registered user, thereby making the location of the user device an accurate proxy for the location of the registered user.

Each student device 110, 120 also includes a system for identifying the location of the device. For example, student device 110 includes a GPS, global positioning system, service 112 that communicates with a GPS satellite 150. Student device 120 includes a geolocation service 122, such as an application that uses cell tower triangulation or Wi-Fi connectivity to determine the location of the student device. The student devices may include one or more of such systems.

Each instructor device 130, 140 includes an attendance monitor application 131, 141. The attendance monitor is executable code that provides the instructor with access to an attendance monitor account. The instructor attendance monitor application may be downloaded and run on a number of different devices. This is because the instructor may have multiple different locations from which they teach classes. Also, the location of the instructor device may, but does not necessarily need to be used.

In one embodiment, the instructor device may be a desktop computer such as device 130. The instructor runs the attendance monitor through a desktop application 132, though it should be appreciated that the desktop application is not limited to being utilized on a desktop computer but also could be used on a mobile device. The desktop application provides a user interface, such as a GUI, that enables the instructor to input information about an event. For example, the instructor may set a date, and a time for the event. The instructor may also set a location. For example, the instructor may use Google Maps, or a similar application, which may also be integrated with the desktop application 132, to identify a location area for the event. The location area may surround the area where the instructor device 130 is located, or the instructor may set a different, remote area as the location area for the event.

Alternately, the instructor could utilize a mobile device such as instructor device 140. The mobile device may utilize the same attendance monitor as the desktop device 130. It may also include an instructor web browser application 142 that operates to provide the instructor with access to an interface, such as a GUI, so that the instructor may input a date and time for an event to occur. The instructor may also input a location area for the event. For example, the instructor may use Google Maps, or a similar application, which may also be integrated with the instructor web browser 142, to identify a location area for the event. The location area may be set so as to create a radius (or area) around the instructor device 140 wherever that device is located during the event. In that embodiment, the instructor device may utilize a geolocation service, such as cell tower triangulation, Wi-Fi identification, GPSs, or the like, to track the location of the instructor device 140 during the event and move the location area of the event in response to movement of the instructor device 140. That allows the instructor the ability to hold events at a location, but also to move the location of the event without having to reset the location through the GUI.

Allowing the event location to track the location of the instructor device 140 may further be useful where the event location changes during the course of the event. For example, if the event is a fieldtrip to a nature preserve, the instructor may set the event location for the duration of the fieldtrip and set the location to a radius of 50 feet from the instructor device 140. As the instructor moves throughout the preserve over the course of the day, the location of the event moves with the instructor. The attendance monitor can then determine which students are present (i.e. within the 50 foot radius) over the course of the day. Alternately, the instructor could use the instructor web browser 142 to set a specific location, independent of the location of the instructor device 140.

The server 103 is also part of the present system. The server connects to the student devices and the instructor devices and maintains the network between the devices. The server may include a number of executable programs and data storage. For example, server 103 includes an account manager 151, a course manager 152, an attendance module 153, a scheduling module 154, each of which includes executable code that provides functionality to the attendance monitoring system. It should be appreciated that each of the account manager 151, course manager 152, attendance module 153, and scheduling module 154 could be programmed as separate programs or compiled together into a single software package. The server also includes a processor 155 and a repository 156. The repository may store the programs on the server as well as data associated with the programs. Alternately, the repository may be a separate storage device that is linked to the server and that may be accessed by the server to transfer data to and from the repository.

More particularly, in one embodiment, the account manager 151 is a database system that interfaces with the student device attendance application 111, 121. Students access the account manager to register their attendance application and their student device. The account manager stores identification information, such as a unique identification number for the student device, a unique identification number (such as a student ID), a student name or the like so as to maintain a profile of the student. The course manager 152 is a database system that interfaces with the instructor desktop application 132 or instructor web browser application 142. It stores information input by the instructor relating to events. Both the instructors and the students may register through an account creation interface 700 as shown in FIG. 7. The interface may include a first name space 701, a last name space 702, an email space 703, a password space 704, a confirmation password space 705, and an identification number space 706. The input information may be used to link students and instructors with the events scheduled by the instructors.

For example, an instructor may access the course manager 152 through the instructor desktop application 132 or instructor web browser 142. The instructor creates an account by entering information on a menu, shown in FIG. 7, that may be managed by the course manager. The instructor inputs identification and security information to create an account. Then the instructor may log in to the account and call up an interface to allow the instructor to input data.

Figure 4:
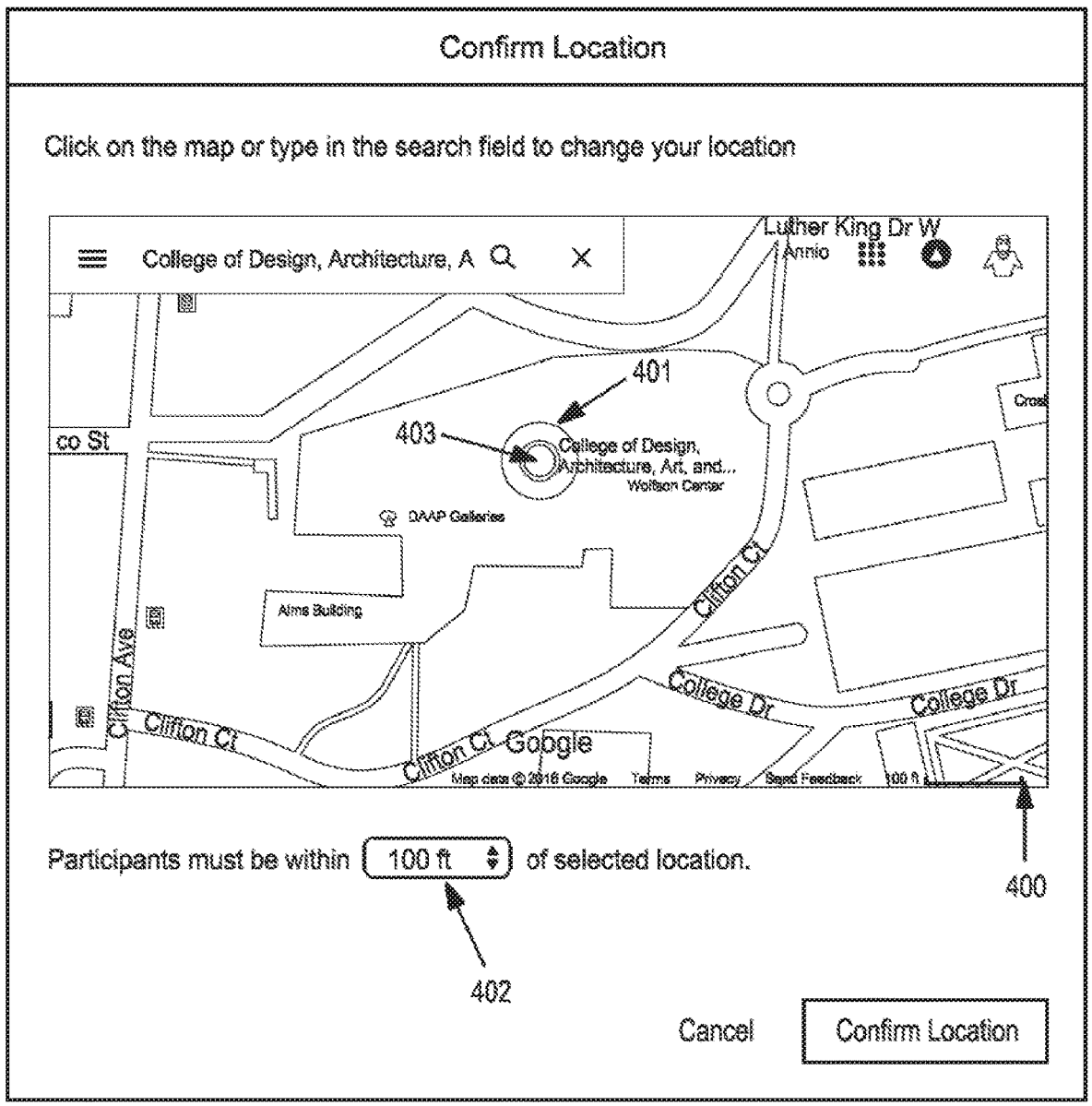
FIG. 4 is a depiction of a location area selection map.
Figure 8:
FIG. 8 is a depiction of a course menu display utilized through the instructor desktop application or instructor web browser application.

One example of a GUI through which an instructor may input information about courses to be managed by the course manager is depicted in FIG. 8. The instructor may create a number of course profiles such as CHEM01, CALC03, and NAT02 corresponding to an introductory chemistry class, an advanced calculus class, and a nature elective class. The instructor may set the schedules for each class, such as CHEM01 on M, W, F from 10:00 a.m. to 12:00 p.m., CALC02 on T, TH from 8:00 a.m. to 10:00 a.m. and NAT02 on Thursdays from 1:00 p.m. to 5 p.m. Start dates and end dates may be assigned to the events as well as term indications and course titles. The location area may also be set for each event. The instructor may identify a location on a map and select a radius, for example 100 feet as shown in FIG. 4. For example, the location area for CHEM01 may be set at 150 feet from the center of a large lecture hall in a campus chemistry building. The location for CALC03 may be set at 50 feet from the center of a small class room in a campus engineering building. Alternately, the instructor may set a location based on the location of the instructor's device. For example, the location area for NAT02 may be set at 100 feet from the location of the instructor's mobile device.

The attendance module 153 creates a network over the internet among the instructor device attendance monitor 131, 141 and each student attendance application 111, 121. With reference to the instructor device 140 for example, in practice, the instructor 102 activates the attendance monitor 141 by launching the attendance monitor 141 on the instructor device 140. The attendance monitor 141 connects to the attendance module 153 through the internet. At the event time, such as Thursday at 1:00 p.m. for NAT02, the instructor activates the attendance module 153 by selecting a button in the instructor web browser 142 to begin the event which sends a signal to the attendance module 153. The attendance module receives the signal from the instructor device and then sends a signal to each registered student device asking for permission from the student to gather location related information. The student device 111 receives the signal from the attendance module and generates an alert through the attendance application that informs the student that the attendance module is requesting location information. The student grants permission through the attendance application, such as by activating a button or swiping the screen of the student device. The attendance application then transmits a signal to the attendance module that contains information relating to the position of the student device. The attendance module then determines the proximity of the student to the center of the event location area and determines whether that proximity is within the set area (for NAT02, for example, the proximity required is 100 feet from the instructor). If the proximity is within the set area, the attendance module records the student as "present" and may send a message to the instructor providing that information. Alternately, the attendance module may transmit the event location to the student device and the attendance application 111 may determine the student device proximity to the center of the area and transmit that proximity or a "present" status if the proximity is within the proper range to the attendance module 153.

The area set to define the location of the event may be set to have "soft" boarders. That is, the area need not include a definitive boarder. For example, when a session is defined as having an area that extends 100 feet from the instructor's location, the instructor's location may only be known to within a 10 foot radius of certainty. Thus, the area of the session may be provided with at least a 10 foot buffer zone. Similarly, when a student is checking in, the actual location of the student may not be known, but the student device may gather data sufficient to define an area having a 10 foot radius in which it is highly likely that the student is within. Because the teacher location includes a 10 foot radius buffer, and the student location includes a 10 foot radius buffer, the system may accommodate for such uncertainty by permitting 20 foot buffer zone. This may be implemented based on the center of the proctor location area $C_P$, center of the student location area $C_S$, proctor radial buffer $R_P$, student radial buffer $R_S$, and the radius of the event location area $R_{session}$. In different embodiment, values for $R_P$ and $R_S$, may be set manually by the proctor, set by default by the account manager 151, imported from settings associated with the specific user devices 110, 120 and proctor device 130, 140, etc. The theoretical distance between the student and proctor is D, defined as the distance between $C_P$ and $C_S$, and the closest possible distance between the student and proctor is $D_0$, calculated as $D_0 = D - R_P - R_S$. To account for the soft boarder, the system may consider any value of $D_0$ that is less than or equal to $R_{session}$ as indicating that the student is present within the location area.

The student device need not send the student's actual location, and preferably does not. The system also preferably does not store the student's location. By not storing the student's actual location, a degree of anonymity is achieved and preserved while still ensuring that proper attendance credit is assigned to the specific individual. That is, the system operates to assign and store a "present" value to a specific known individual, and thus an instructor can be sure that the individual was present. However, the instructor cannot know exactly where the student was located during the class. Thus, instructor and students may meet within a classroom setting and have face-to-face discussions without the instructor actually knowing the identity of the student, and yet that student will still receive credit for being present at the class. This arrangement allows for personal communication yet in an anonymous manner. Such a setting may be useful in classes where the free flow of ideas, including the expression of ideas that may be contrary to the ideas/opinions espoused by the instructor, is desired as it mitigates the potential that the expression of such ideas by individual students will be counted against the student by the instructor, consciously or unconsciously, during a graded assignment. Thus students remain free to express themselves without fear of negative repercussions for unpopular (in the teacher's mind) views and thereby enhance participation and dialogue.

Figure 2:
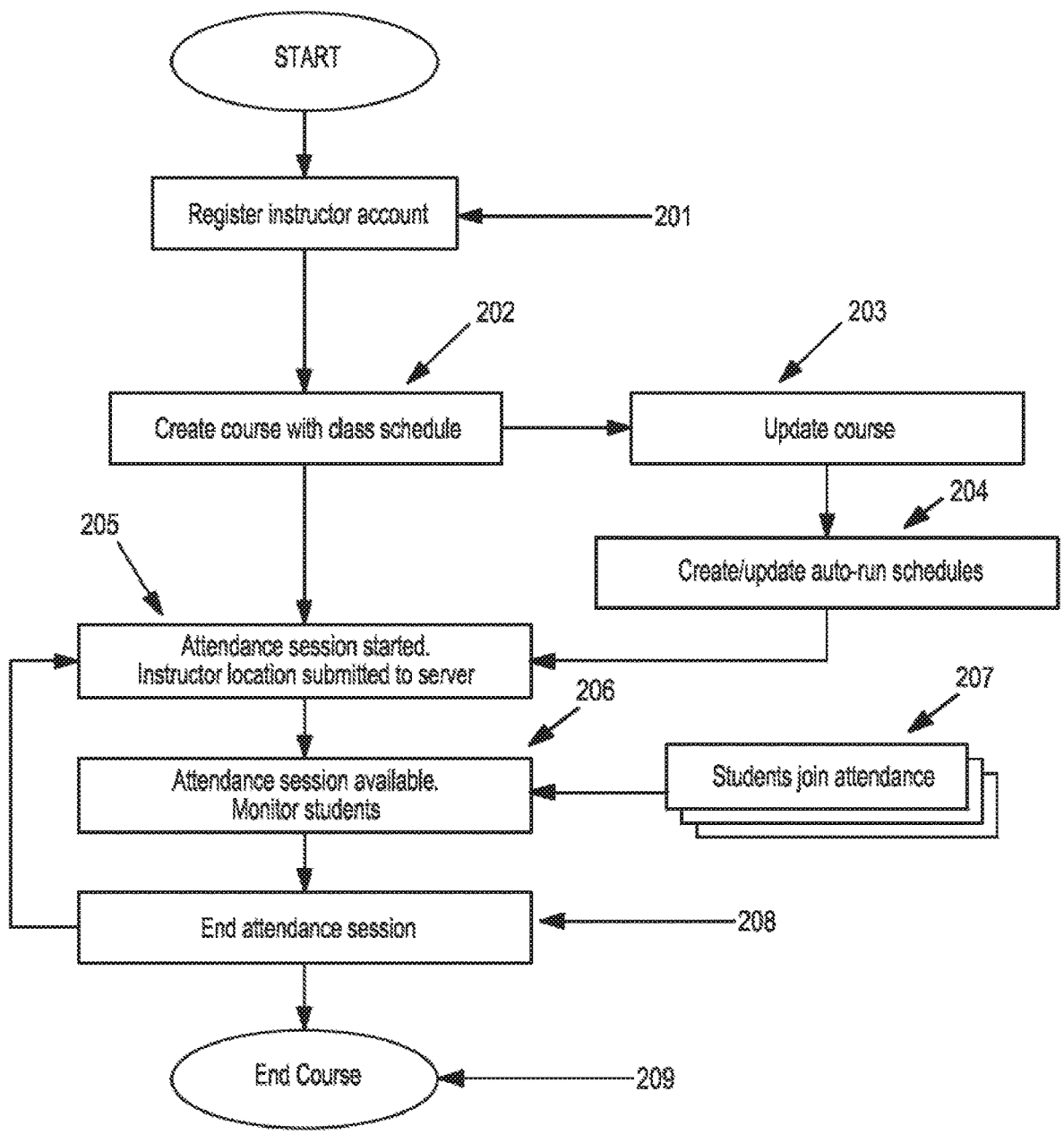
FIG. 2 is a flowchart depicting the proctor's creation of a meeting event and the monitoring of user participation at the event.

One embodiment of the operation of the present system from the instructor's side is set forth in the flowchart of FIG. 2. The monitoring system begins when the instructor registers an instructor account 201. The instructor account is stored by the server 103 and managed through the account manager 151. The instructor creates a course class schedule at 202. For example, the instructor creates the course "CHEM01" having a class schedule of M, W, F from 10:00 a.m. to 12:00 p.m. with location area of 150 feet from the center of a large lecture hall in a campus building. The class days may be input manually or selected from a dropdown menu, or selected on a pop-up calendar, for example. The class time may similarly be input manually, selected from a dropdown menu or selected on a pop-up clock face, for example. Also the location area may, for example, be selected from a menu of preset event locations or, as shown in FIG. 4, through using a virtual pin 403 on a pop-up map 400 (such as on Google maps), and the size of the area may be altered by, for example, dragging the perimeter of an area circle 401 in or out, by selecting a radius from a dropdown menu 402 or by manually inputting a radius. Preferably the class schedule is stored on the server.

Once a course is created, the instructor may start an attendance session 205. Alternately, the instructor may update the course information 203, such as changing the time or location of course. The instructor may create an automatic run for utilizing Session Mode at step 204. This allows the instructor the option of setting a time where the system will, at the scheduled time and without the instructor's further input, send a signal to the student device requesting permission from the student to gather student device location information. The auto-run schedule may be set to run to send a discrete number of requests or run for a discrete length of time, such as from five minutes before class starts to five minutes after class starts in order to encourage prompt arrival of the students. After the number of requests expires or the time is up, the system will stop asking for permission and any late students will not be provided an opportunity to grant permission in order to subsequently be counted by the system as present. If the instructor prefers manual mode, the auto-run schedule step 204 may be skipped. It should be understood that the update step 203 and the create/update auto-run schedule step 204 may be accomplished as separately or simultaneously.

In an alternate embodiment the proctor may modify the course schedule by subdividing the arrival time to more accurately track the arrival of students. For example, the instructor may schedule the attendance session to run from 15 minutes before the scheduled start of class to fifteen minutes after the start of class. However, that block of 30 minutes may be subdivided such that any students logging in within the initial ten minutes are logged as "present-early," students logging in within the middle ten minutes are logged as "present," and students logging in within the last ten minutes are logged as "present-tardy". Other subdivisions could also be utilized, and the system could be further refined to track the time that the user logged in.

The system starts an attendance session at 205. At this step, in manual mode the instructor selects a prompt on the instructor device to request permission from the student device for location information, while in Session Mode the scheduling module 154 automatically sends the request for permission from the student device for location information according to the parameters set by the instructor at step 204. The attendance module 153 enters an Attendance session at 206 to monitor response from student devices and waits for responses from the student devices. Students grant permission to send responses to join the event at step 207. The attendance module may then compare the information provided by the students' devices to the location area set by the instructor and determine whether the student should be identified as "present". Alternately, the request for student location information may also include information about the location area and the student device may perform the comparison and then send a location information signal that simply identifies the student as "present" within the location area. The student's status as "present," optionally along with the student's proximity to the center of the location area, may be stored by the server in repository 156, and the instructor's attendance monitor 131, 141 may be updated by the attendance module 153 with the statuses of the students that are "present." At the conclusion of the session time (or maximum number of student information requests is reached) the attendance module stops requesting student information, the attendance monitoring is complete and the attendance session is ended at 208. Based on the class schedule, the monitoring system will return to step 205 at the next scheduled event time and date. When the course with class schedule set in step 202 or 203 is completed, the monitoring system ends at 209 and the attendance module 153 waits for further input, such as the creation of a new or modified course and class schedule, from the instructor.

In an alternate embodiment, the attendance module does not request information from the student. Instead, it is the responsibility of the student to affirmatively transmit their location information at the correct time and within the correct location area using the attendance application 111. Where a student is outside of the area, or where an attendance session is closed (either because the event has not started yet or because the student is too late to check-in) the attendance module 153 will not accept the student's data. Preferably, the attendance module transmits a response to the student when it accepts data, indicating that the student is checked in as present, or when the data is not accepted, indicating that that the student is not checked in (and preferably an explanation as to why the data was rejected, such as "out of location area" or "event session closed").

Figure 5:
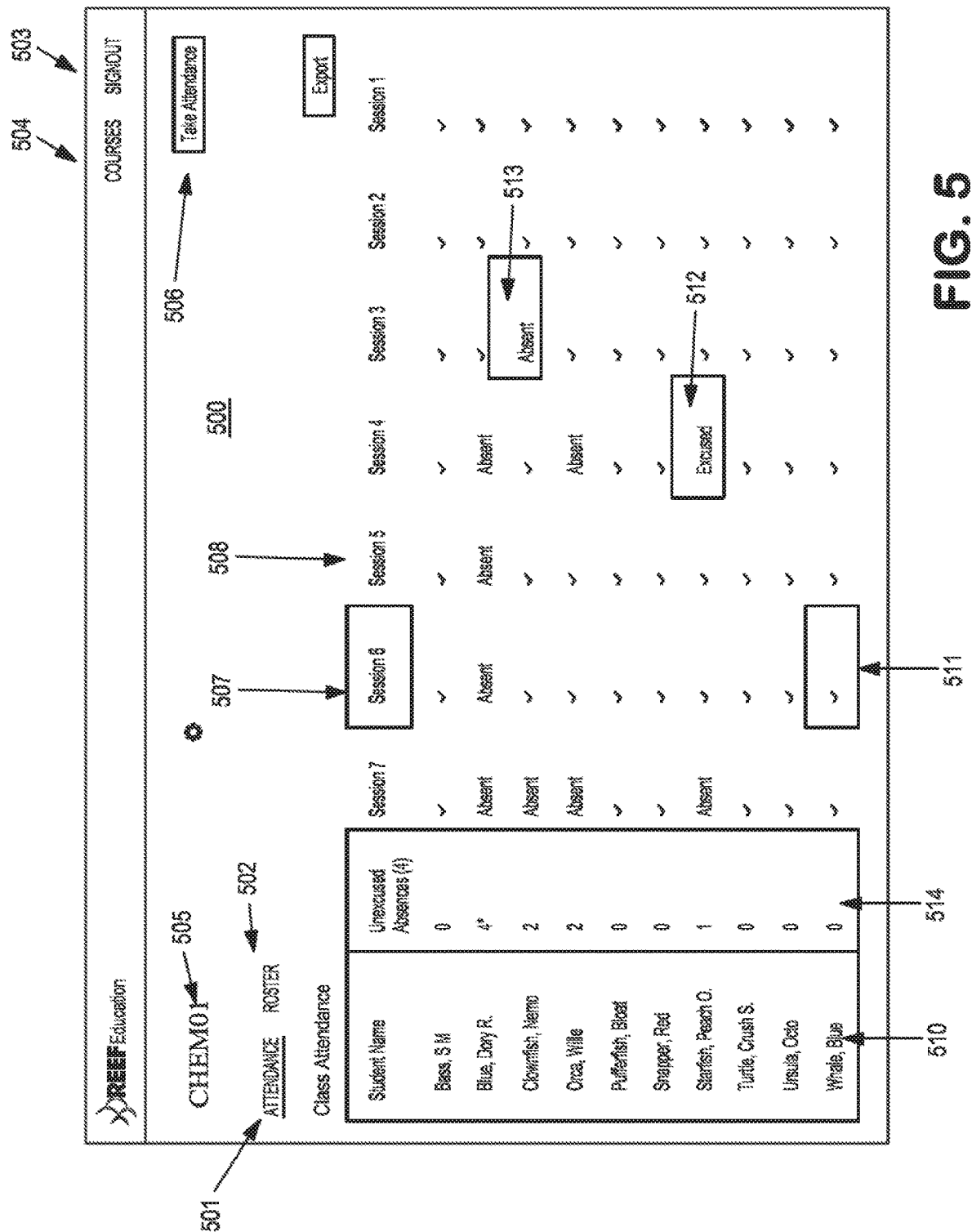
FIG. 5 is a depiction of a proctor's attendance monitor display.

A depiction of one embodiment of the instructor attendance monitor 131, 141 is depicted in FIG. 5. As noted above, the instructor attendance monitor 131 runs on the instructor's device. It may be launched through the instructor desktop application 132, through the instructor web browser 142, or separately. FIG. 5 provides an embodiment of the interface 500, in this case a GUI, for the instructor attendance monitor 131. It includes a sign-in/sign-out button 503, and a courses menu 504 for selecting courses, a course identification 505, and an attendance button 506. It can also toggle between an attendance page (shown) by selecting the Attendance button 501, and a class roster (not shown) listing the students in the class by selecting the Roster button 502

The attendance button calls an attendance grid 508 that is populated with attendance related information. The grid displays event identification information in one or more cells, such as cell 509. In cell 509, the event name ("Session 6") and the date of the event may each be displayed. More or less information could also be provided. Attendance grid 508 also includes a registered student list 510. The list 510 may display the student's names, student ID, or another unique identifier for each student registered for the class. In rows across from the student identification information are indicator cells, for example, cells 511, 512, and 513. Preferably, each student is provided with one cell corresponding to one event. For example, cell 511 is a cell for the Session 6 event and is associated with the student Blue Whale.

In one embodiment, three indications are permissible, a check, as in cell 511 (indicating the student is present), an "absent" indication as in cell 513 (indicating the student is absent), and "excused" (indicating the student is absent but the absence is excused). Other or alternate indicators may also be used. The indicator cells may be updated by the attendance module 153 when students grant permission to share attendance information. Preferably, all of the cells for an event indicate that all students are absent before the event starts. Once the event begins, each student's status is updated as each student checks in. When a student fails to check-in, perhaps because the student was too late to check-in or because the student never entered the event location area, the student's status is left as "absent". In one embodiment, when a student grants permission to disclose location information and the student is within the event location area, the attendance module will change the student's status from absent to present and the instructor module will update the proper cell of grid 508 to indicate the student is present, for example by placing a mark in the proper cell. In an alternate embodiment, the instructors may manually change the status of each cell as well. The grid 508 also includes a total absences column 514. The cells in the total absence column maintain a running tally of each student's total absences.

Figure 3:
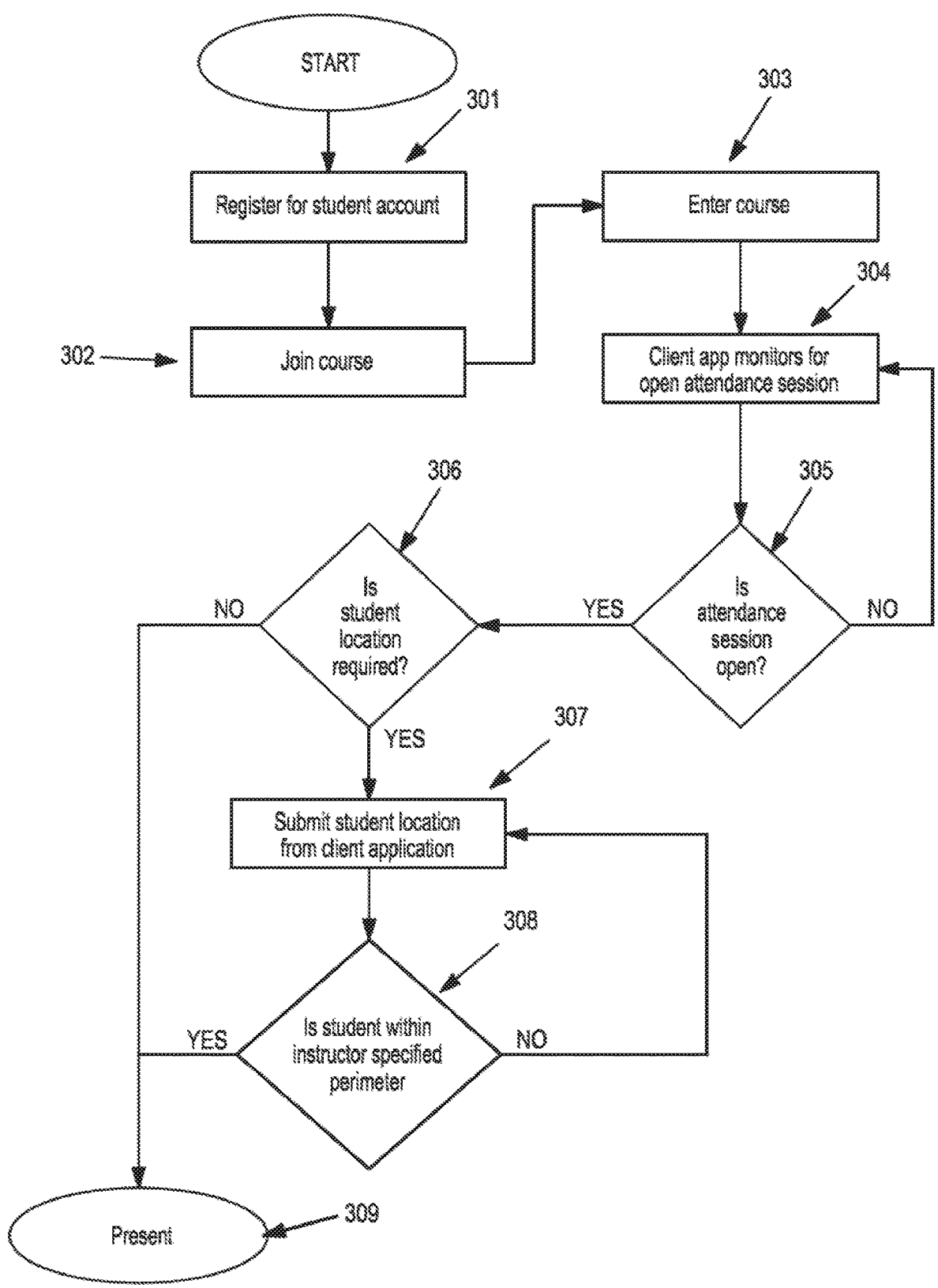
FIG. 3 is a flowchart depicting a user's registration in the system and use of the system to participate in providing location monitoring information and identification of the user's presence at an event.

The chart in FIG. 3 sets forth the operation of the attendance monitoring system on the students' side according to one embodiment. The student accesses functionality through the attendance application 111. The system begins with the student registering a device and attendance application through registration of a student account 301. Once registered, the student may join a course, 302, that the instructor has previously created (202). When the student arrives at the event location, the student may choose to enter the course (303) to allow the attendance application to engage in communication with the attendance module (including, but not limited to, requesting event data, and receiving event data) at steps 304-305. If an attendance session is not opened by the instructor at that time, the attendance application 111 continues to monitor.

To save battery, the attendance application may be provided with a time-out option where the attendance application will shut-down or sleep after a predetermined time of not receiving a request for information or receiving other event data. If an attendance session is open, the student receives event data, such as a request for location information or location information respecting the event, from the attendance module 153. The attendance application determines what information is requested, such as location information or a "present" notification at step 306. If student location information is required, the attendance application submits the location information to the attendance module at step 307. In one embodiment, the student is required to provide permission at step 307 to send the location information. In an alternate embodiment the student grants permission to send location information when the student enters the course at step 303. The student location information is sent to the attendance module 153 and it determines at step 308 if the student is present in the event location. If the student is present, the attendance module stores a "present" status for the student 309, and may update the instructor attendance module 131.

Alternately, other information could be requested at step 306, such as a request to identify a "present" status. In such an embodiment, the student attendance application 111 receives event data from the attendance module 153 at step 306 triggering a request to determine the student's status. At step 307, the student device retrieves its location. Then at step 308, the student device determines whether it is within the specified event location and sends a "present" notification at step 309 if that is true.

It is preferred that the student must grant permission to transmit location information at least once per session and that the student may not grant permission to send location information for more than a single session at a time. Such restrictions ensure that the student makes an informed decision to transmit location information each time a new event occurs. In one embodiment, the student location information is then sent to the attendance module which determines at step 308 whether the student is within the event location area by determining the proximity of the student to a location within the event location area, preferably the center of the area. In an alternate embodiment the comparison may be performed by the attendance application 111 at step 308 and the result transmitted to the attendance module. The attendance module then updates the status of the student based on the information sent by the attendance application, for example by indicating "present" at 309. That status may then be sent to the attendance monitor 131 to update the grid 508. In some embodiments it may be preferable perform the comparison through the attendance application because that distributes the processing of the comparison among numerous devices, particularly in a large lecture hall when many students attempt to check-in at approximately the same time. That speeds up the check-in process because the server does not need to process the comparisons, and it can instead dedicate resources to sending and receiving transmissions and updating the statuses of the students.

The attendance monitoring system may run in Manual Mode or Session Mode. In manual mode, the instructor activates an attendance taking command at the beginning of a session by making a selection in the instructor desktop application 132 or instructor web browser 142. FIG. 6 is a depiction of one embodiment of the instructor desktop application 132 configured for monitoring a single event (for ease of reference only application 132 is referred to for the following explanation though the explanation is equally applicable to instructor web browser 142). The application includes a start/stop button 601. The instructor selects the start button when the event begins and selects stop when the instructor wants the application to stop accepting attendance information from students. For Session Mode, the instructor pre-sets start and stop times. At the pre-set time, the attendance monitor 131 automatically enables the acceptance of information from student devices. The instructor may select the start/stop button before the scheduled time if the instructor wishes to open the event early, may select the stop button if the instructor wishes to stop an open scheduled attendance event, and may select the start button to re-open a stopped event. In both Manual Mode and Session Mode, the instructor desktop application displays a student identifier, 602, such as a name, the student status 603, and, if the student is checked in, the check-in time 604, as well as event identification information 605.

In another embodiment, the attendance module 153 may periodically check whether a student is still present. The attendance module 153 or scheduling module 154 working in conjunction with the attendance module 153 may be set to request location information from the student device one or more times after the initial request for location information that the student responded to by granting permission. Once the student grants permission to transmit location information at the beginning of the event, the attendance module is free to gather location information for the duration of the event. In one embodiment, the attendance module requests location information on a periodic basis, such as every 5 to 10 minutes. In another embodiment the attendance module requests information on a random basis, or on a combination of a periodic and random basis. The student attendance application transmits information, such as location information, to indicate whether the student is present or not. Non-receipt of information in response to a request may be considered an indication of "not present" and the student's status as "not present" may be updated on the instructor's desktop application.

However, it is preferred that a certain grace period be factored into account for a student's temporary exit from the event location area, such as for a restroom break. In an alternate embodiment, after the initial receipt of a permission grant by a student, the attendance module sends additional requests for student information. In the event that a request received no response, indicating the student is out of the event location area, or an affirmative response indicating that the student is out of the event location area, the attendance module may be programed to send repeated requests for location information on a routine basis and short time frame, for example a request every minute. The instructor may pre-set the length of time for the requests, their frequency, or the total number. This allows a student to reenter the class after a brief absence and remain counted as present within the location area of the session.

It is preferable that the student's status is not altered on the instructor's desktop application until the preset parameter limits are reached. For example, the attendance module sends repeat requests once every 15 minutes and waits for a response from the students. Alternately the requests could be sent in bursts, such as a burst of 5 requests over the course of 1 second every 15 minutes where a student's response to any one of the requests is counted as the student remaining "present." If a student's device does not respond, the attendance module may begin sending requests every minute for the next 10 minutes. If the student responds to one of the requests, the attendance module switches back to sending requests according to the general 15 minute schedule. If the student does not respond after 10 minutes, the student's status is changed to "absent" and the attendance module 153 sends an update to the attendance monitor 131 to update the desktop application 132. Alternately, the attendance application may be set to transmit location information at various times throughout the event after the first permission to send location information is granted. The attendance module tracks the information coming from the student attendance application and, if no information is received from a student attendance application for a designated period of time (which may be a default time or a time set by the instructor) the attendance module updates the student's status to "absent."

In another embodiment, the user devices use information about the user device to check-in with the server at one or more additional times during an open session. For example, the student may grant permission to the attendance application to transmit data about the user device during the scheduled session period. The attendance application may, for example in response to a sudden acceleration, monitor the location of the user device for a period of time and determine whether the user device is moving away from the "present" location that the user device occupied when the user logged in at the start of the session. Upon determining that the user device has moved a significant distance (a distance that may, for example, be predefined by the attendance application or defined by the proctor for a given session) the user device may transmit information to the attendance module 153. This data may be used by the attendance module to determine whether the user device is still "present" at the class. The attendance application may be programmed to continue to transmit data, or to transmit data again after another sudden change when that sudden change occurs during the session time. Further restrictions or operating parameters may also be set, such as retransmission of data for set lengths of time or retransmission only when the user device is within the area defined for the class. The attendance module 153 may utilize the data transmitted by the user device and update the attendance monitor 131, 141 to indicate the status of the user. This provides an alternate way for the system to accommodate user to temporarily exit the location of the open session and return without being marked absent, while also avoiding having users check-in at the beginning of a class to get credit for attending but then leaving and not returning.

It should be appreciated that each of the embodiments described herein may include more or less functionality than what is described with reference to the preferred embodiments. Features described with respect to one embodiment may be included or omitted from other embodiments. Although the present system has been described in terms of the preferred embodiments, it is to be understood that such disclosure is not intended to be limiting. Various alterations and modifications will be readily apparent to those of skill in the art. Accordingly, it is intended that the appended claims be interpreted as covering all alterations and modifications as fall within the spirit and scope of the invention.

What is claimed is:

1. An attendance monitoring system comprising:
  a server connected to a network, a course manager stored on the server, an attendance module stored on the server, and, associated with the server, a repository that
    a) stores data relating to at least one user,
    b) stores data relating to at least one proctor, and
    c) stores data relating to at least one event including a location area for at least one event,
  wherein the course manager has access to data stored in the repository,
  wherein the attendance module receives one or more signals through the network containing location information corresponding to the user and identification information corresponding to the user, wherein the attendance module is further configured to compare the location information corresponding to the user with a stored location area for an event and compare the time that the location information was received to a time for the event and
a) reject the location information corresponding to the user if the location information is received outside of a predetermined time frame,
b) reject the location information corresponding to the user if the location information indicates that the user's location is outside of the location area for an event,
c) record an indication that the location information corresponding to the user is within the location area if location information corresponding to the user is within the location area, and
d) update a database to indicate that the user associated with the identification information is present within the stored location area if the location information received indicates a location corresponding to the user that is within the location area, and wherein the attendance module is further configured to transmit one or more signals containing information about the presence of the user associated with the identification information if the comparison indicates that the location information indicates a location that is within the location area.

2. The attendance monitoring system of claim 1, wherein the attendance module is further configured to transmit location request signals at a set period over a time period during the event.

3. The attendance monitoring system of claim 2, wherein the attendance module is configured to vary the period of location request signals sent to a user if no response to one of multiple location request signals sent to the user in the set period is received by the server.

4. The attendance monitoring system of claim 1, wherein the attendance module is further configured to transmit location request signals at irregular intervals over a time period during the event.

5. The attendance monitoring system of claim 1 further comprising: a plurality of user devices connected to the network and an attendance application stored on the plurality of user devices,
wherein the attendance application is configured to issue a prompt requesting authorization to transmit the location information in response to the receipt of a request for the location information sent by the attendance module,
wherein the attendance application is configured to receive an input indicating an authorization to transmit the location information, and
wherein the attendance application is configured to transmit location information pertaining to the location of the user device to the attendance module only after
a) receiving a location request signal from the attendance module, and
b) receiving an input indicating an authorization to transmit the location information.

6. The attendance monitoring system of claim 1 further comprising:
a proctor device connected to the network and an attendance monitor stored on the proctor device,
wherein the proctor device includes a display,
wherein the proctor device is configured to receive the one or more signals containing information about the presence of the user associated with the identification information, including an indication that the user is present, if the comparison indicates that the location information indicates a location that is within the location area,
wherein the attendance monitor is configured to display a list of one or more users and one or more status indicators associated with at least one of the users,
wherein the attendance monitor is configured to update at least one of the status indicators to indicate that the associated user is present upon receipt of the one or more signals indicating that the user is present, and
wherein the server and the proctor device are configured such that neither the server, repository, nor proctor device stores the transmitted location information of student.

7. An attendance monitoring system comprising: a server connected to a network, a course manager stored on the server, an attendance module stored on the server, a repository associated with the server that stores data, a plurality of user devices connected to the network, an attendance application stored on a plurality of the user devices, a proctor device connected to the network, and an attendance monitor stored on a proctor device,
wherein the course manager has access to stored data relating to
a) at least one user,
b) at least one proctor, and
c) at least one event;
wherein the attendance module is configured to receive through the network one or more signals requesting data relating to the event and transmit through the network signals providing data relating to the event to user devices;
wherein the attendance application is configured to gather location information about the location of at least one user device on which the attendance application is stored and location information about the location of a proctor device, receive data relating to the event including a location area for the event where the location area is dependent on the location of the proctor device and the attendance application is configured to alter the location area if the proctor device moves, compare the location information of at least one student device to the location area, determine a proximity of the user device to a location within the location area if the user device is within the location area, and transmit to the server a proximity signal containing an indication of the proximity where the user has authorized the transmission of the proximity signal;
wherein the attendance module is further configured to update the repository after receipt of the proximity signal to indicate that the user associated with the proximity signal is present within the location area, and
wherein the attendance module is further configured to transmit one or more signals containing information about the presence of the user associated with the proximity signal to the attendance monitor stored on the proctor device.

8. The attendance monitoring system of claim 7, wherein the attendance monitor is configured to update a display of the proctor device in response the receipt of the one or more signals containing information about the presence of the user associated with the proximity signal.

9. The attendance monitoring system of claim 7, wherein the attendance module is further configured to periodically transmit a location area signal during the event and the attendance application is further configured to determine a proximity of the user device to a location within the location area if the user device is within the location area, and transmit to the server a proximity signal containing an indication of the proximity without further authorization from the user.

10. The attendance monitoring system of claim 9, wherein the attendance module is configured to vary the frequency of the transmission of location area signals sent to a user if no proximity signal is received by the server from the user in response to the transmission of one or more location area signals.

11. The attendance monitoring system of claim 7, wherein the attendance module is further configured to transmit a location area signal at irregular intervals during the event and the attendance application is further configured to determine a proximity of the user device to a location within the location area if the user device is within the location area, and transmit a proximity signal to the server containing an indication of the proximity without further authorization from the user.

12. An attendance monitoring system comprising:
a server connected to a network, a course manager stored on the server, and an attendance module stored on the server, and, associated with the server, a repository that
a) stores data relating to at least one user,
b) stores data relating to at least one proctor, and
c) stores data relating to at least one event including a location area for at least one event,
wherein the course manager has access to data stored in the repository,
wherein the attendance module is configured to allow the server to receive through the network one or more signals requesting data relating to an event, to transmit through the network one or more signals providing data relating to the event, and to receive one or more signals through the network containing location information and identification information corresponding to the user,
wherein the attendance module is further configured to compare the location information corresponding to the user with a stored location area for the event and compare the time that the location information was received to a time for the event and
a) reject the location information corresponding to the user if the location information is received outside of a predetermined time frame and transmit a signal to the user device indicating that the location information was rejected as being outside a required timeframe,
b) reject the location information corresponding to the user if the location information indicates that the user's location is outside of the location area for an event and transmit a signal to the user device indicating that the location information was rejected as being outside the location area, and
c) record an indication that the location information corresponding to the user is within the location area if the location information corresponding to the user is within the location area,
wherein the attendance module is further configured to update the repository to indicate that the user associated with the identification information is present within the stored location area if the location information received indicates a location that is within the location area, and
wherein the attendance module is further configured to transmit one or more signals containing information about the presence of the user associated with the identification information if the comparison indicates that the location information indicates a location that is within the location area.

13. The attendance monitoring system of claim 12, wherein the attendance module is further configured to transmit location request signals at a set period over a time period during the event.

14. The attendance monitoring system of claim 13, wherein the attendance module is configured to vary the period of location request signals sent to a user if no response to one or more location request signals sent to the user is received by the server.

15. The attendance monitoring system of claim 12, wherein the attendance module is further configured to transmit location request signals at irregular intervals over a time period during the event.

16. The attendance monitoring system of claim 12, further comprising: a plurality of user devices connected to the network and an attendance application stored on the plurality of user devices,
wherein the attendance application is configured to issue a prompt requesting authorization to transmit the location information in response to the receipt of a request for the location information sent by the attendance module,
wherein the attendance application is configured to receive an input indicating an authorization to transmit the location information, and
wherein the attendance application is configured to transmit location information pertaining to the location of the user device to the attendance module only after
c) receiving a location request signal from the attendance module, and
d) receiving an input indicating an authorization to transmit the location information.

17. The attendance monitoring system of claim 12 further comprising:
a proctor device connected to the network and an attendance monitor stored on the proctor device,
wherein the proctor device includes a display,
wherein the proctor device is configured to receive the one or more signals containing information about the presence of the user associated with the identification information including an indication that the user is present if the comparison indicates that the location information indicates a location that is within the location area,
wherein the attendance monitor is configured to display a list of one or more users and one or more status indicators associated with at least one of the users, and
wherein the attendance monitor is configured to update at least one of the status indicators to indicate that the associated user is present upon receipt of the one or more signals indicating that the user is present.

18. A method of monitoring attendance through the use of a server connected to a network, a course manager stored on the server, an attendance module stored on the server, at least one proctor device connected to the network, at least one user device connected to the network, and a repository associated with the server that
a) stores data relating to at least one user,
b) store data relating to at least one proctor, and
c) stores data relating to at least one event including a location area for at least one event, the method comprising:

the server receiving through the network one or more signals requesting data relating to the event and subsequently transmitting through the network one or more signals providing data relating to the event to the user device, upon receipt by the user device of the one or more signals providing data relating to the event, generating an alert by the user device requesting authorization for the transmission of location information of the user device, transmitting the location information of the user device to the server after receiving the authorization, comparing the location information of the user device to a location area stored in the repository, updating the status of the user associated with the device with an indication that the user is present where the comparison indicates that the user device is within the location area or sending a rejection notice that the user device is outside of the location area if the comparison indicates that the user device is outside the location area, transmitting one or more signals to the proctor device indicating that the user is present where the comparison indicates that the user device is within the location area, upon receipt by the proctor device of one or more signals indicating that the user device is within the location area, displaying on the proctor device a plurality of indicators associated with a plurality of the users and updating at least one of the indicators to display the status of a user as present.

19. The method of monitoring attendance of claim 18 further comprising:

after receiving the authorization to transmit the location information of the user device, periodically transmitting additional requests for location information, receiving one or more of the periodically transmitted additional requests by the user device that received authorization to transmit the location information, and in response to the receipt the periodically transmitted additional requests, transmitting location information without receiving additional authorization.

* * * * *